United States Patent
Hashimoto

(10) Patent No.: US 8,800,203 B2
(45) Date of Patent: Aug. 12, 2014

(54) PLANTING CONTAINER

(75) Inventor: Masaki Hashimoto, Ibaraki (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 470 days.

(21) Appl. No.: 12/443,763

(22) PCT Filed: Oct. 1, 2007

(86) PCT No.: PCT/JP2007/069160
§ 371 (c)(1),
(2), (4) Date: Dec. 31, 2009

(87) PCT Pub. No.: WO2008/047590
PCT Pub. Date: Apr. 24, 2008

(65) Prior Publication Data
US 2010/0095588 A1    Apr. 22, 2010

(30) Foreign Application Priority Data

Oct. 11, 2006  (JP) .................. 2006-277754
Mar. 30, 2007  (JP) .................. 2007-092612

(51) Int. Cl.
*A01G 25/00*    (2006.01)
*A01G 9/02*     (2006.01)

(52) U.S. Cl.
USPC ............................. 47/82; 47/65.9

(58) Field of Classification Search
USPC ............ 47/66.1, 66.5, 65.5, 82, 83, 65.9
See application file for complete search history.

(56) References Cited

U.S. PATENT DOCUMENTS 2,089,220 A * 8/1937 Norman ............... 47/81
2,484,909 A * 10/1949 Ritter .................. 47/79

FOREIGN PATENT DOCUMENTS

| JP | 3-37836 | 4/1991 |
| JP | 3-254610 | 11/1991 |
| JP | 5-308852 | 11/1993 |
| JP | 7-123866 | 5/1995 |
| JP | 7-274729 | 10/1995 |
| JP | 9-9787 | 1/1997 |

(Continued)

OTHER PUBLICATIONS

International Search Report mailed Oct. 23, 2007 in International PCT Application PCT/JP2007/069160 filed Oct. 1, 2007.

(Continued)

*Primary Examiner* — Monica Williams
(74) *Attorney, Agent, or Firm* — Drinker Biddle & Reath LLP

(57) ABSTRACT

A planting container body (1) has a bottom wall (3) and side walls (4) forming a planting space (2) and also has a water-holding section for holding planting water supplied to the planting space (2). The water-holding section has a water discharge opening (12) for overflow. In a horizontal position (A) in which the planting space (2) opens upward, the bottom wall (3) and the side walls (4) form a horizontal water-holding section for holding planting water. In a vertical position in which the planting space (2) opens sideways, a vertical water-holding section for holding planting water is formed by the bottom wall (3), side walls (4), and a dam section (8) formed facing the bottom wall (3) on the side wall (4) that is the bottom surface. A water discharge start section of the water discharge opening (12) is located at a position a predetermined distance away from the bottom wall (3) and a predetermined distance away from a side wall (4).

6 Claims, 11 Drawing Sheets

(56) References Cited

FOREIGN PATENT DOCUMENTS

| | | |
|---|---|---|
| JP | 2000-262150 | 9/2000 |
| JP | 2004-57052 | 2/2004 |
| JP | 2004-211373 | 7/2004 |

OTHER PUBLICATIONS

International Preliminary Report on Patentability mailed Apr. 22, 2009 in International PCT Application PCT/JP2007/069160 filed Oct. 1, 2007.

* cited by examiner

PLANTING CONTAINER

TECHNICAL FIELD

The present invention relates to a planting container comprising
 a bottom wall and a side wall forming a planting space; and
 a water-holding section for holding planting water supplied to the planting space,
 wherein the water-holding section has a water discharge opening for overflow.

BACKGROUND ART

A variety of configurations have been proposed in the past for planting containers of such description, which are in actual use.

For example, there exists a planting container with the container body disposed in a horizontal position, so that a planting space opens upwards, allowing placement on a relatively horizontal surface such as a balcony.

There also exist planting containers wherein the container body is disposed in a vertical position so that the planting space opens sideways (e.g., as in Patent Document 1), allowing placement along a relatively vertical surface such as a revetment.

However, there has yet to be a planting container wherein of the body of a single planting container can be disposed in either a vertical or horizontal position.

[Patent Document 1] Japanese Laid-open Patent Application No. 2000-262150

DISCLOSURE OF THE INVENTION

With the foregoing problem of the prior art in view, an object of the present invention is to provide a highly versatile planting container, that can be used in a horizontal position for placing on a relatively horizontal surface, or in a vertical position for placing on a relatively vertical surface.

A first aspect of the present invention for achieving the above object is a planting container, comprising:
 a planting container body having
 a bottom wall and a side wall forming a planting space; and
 a water-holding section for holding planting water supplied to the planting space,
 a water discharge opening for overflow being provided to the water-holding section; wherein:
 the bottom wall and the side wall of the container body form a horizontal water-holding section for holding planting water when the container body is in a horizontal position in which the planting space opens upwards;
 the bottom wall of the container body, the side wall of the container body, and a dam section formed facing the bottom wall on the side wall that is the bottom surface form a vertical water-holding section for holding planting water, when the container body is in an vertical position in which the planting space opens sideways; and
 a water discharge start section of the water discharge opening is located at a position a predetermined distance away from the bottom wall and a predetermined distance away from a side wall.

According to the present aspect, a horizontal water-holding section is formed when the container body is in a horizontal position, and a vertical water-holding section is formed when the container body is in a vertical position. It is accordingly possible for a single planting container to be used either in a horizontal position for placement on a horizontal location such as a balcony, or a vertical position for placement along a vertical wall surface such as a revetment.

A water discharge start section of the water discharge opening for overflow is located at a position a predetermined distance away from the bottom wall of the container body and a predetermined distance away from the side wall of the container body; therefore, a single water discharge opening for overflow functions both as a drainage outlet for the horizontal water-holding section and as a drainage outlet for the vertical water-holding section. Giving the drainage outlet a dual function thus allows the container body to have a simple structure.

As a result, from the standpoint of, e.g., planting container manufacturers, the containers will be able to be made less expensively, while from the standpoint of those who use the planting container, the fact that a single planting container can be used in either a horizontal position or a vertical position depending on the location of use or another factor improves the versatility of the container.

A second aspect of the present invention is that the planting space of the container body is compartmentalized by a partition wall into a plurality of spaces for planting units arranged in a row, the row being in a lateral direction when the container body is in a vertical position; and mutually adjacent spaces for planting units are linked by a communication hole for the planting water, the communication hole being provided on the partition wall.

According to the present aspect, commercially supplied plant bedding, planting soil, or the like can be accommodated and placed in the space for each planting unit that has been compartmentalized by the partition wall; therefore, the space for the planting units can be used effectively.

When the container body is in a vertical position, laterally adjacent spaces for the planting units communicate via the communication hole; therefore, planting water can be effectively supplied to each of the spaces for the planting units via the communication hole provided on the partition wall.

A third aspect of the present invention is that the planting space of the container body is compartmentalized by a sectioning wall into a plurality of spaces for planting units arranged in a row, the row being in a vertical direction when the container body is in a vertical position; and mutually adjacent spaces for planting units are linked by the water discharge opening provided on the sectioning wall.

According to the present aspect, a commercially supplied plant bedding, planting soil, or the like can be accommodated and placed in the space for planting unit that has been compartmentalized by the sectioning wall; therefore, the space for the planting units can be used effectively.

When the container body is in a vertical position, vertically adjacent spaces for the planting units communicate via the water discharge opening; therefore, planting water can be effectively supplied to each of the spaces for the planting units via the water discharge opening provided on the sectioning wall.

A fourth aspect of the present invention is that the planting space of the container body is compartmentalized by a partition wall and a sectioning wall into spaces for planting units arranged in a plurality in each of a lateral direction and a vertical direction when the container body is in a vertical position; spaces for planting units that are mutually adjacent in the lateral direction being linked by a communication hole for planting water provided on the partition wall; and spaces for planting units that are mutually adjacent in a vertical direction being linked by the water discharge opening provided on the sectioning wall.

According to the present aspect, a commercially supplied plant bedding, planting soil, or the like can be accommodated and placed in spaces for each of the planting units that have been compartmentalized by the partition wall and the sectioning wall and arranged in a plurality in each of the horizontal and vertical directions; therefore, the space for the planting units can be used effectively.

When the container body is in a vertical position, laterally adjacent spaces for the planting units communicate via the communication hole, and vertically adjacent spaces for the planting units communicate via the water discharge opening; therefore, planting water can be effectively supplied to each of the spaces for planting units via the communication hole and the water discharge opening.

According to a fifth aspect of the present invention, the water discharge openings that are vertically adjacent when the container body is in an vertical position are located in mutually different positions.

According to the present aspect, planting water flowing downwards from the water discharge opening due to an overflow is contained in a vertical water-holding section of a downwardly placed space for planting unit, and subsequently flows downwards from the water discharge opening of the space for planting unit. Therefore, water can be effectively contained in each vertical water-holding section.

According to a sixth aspect of the present invention, a plurality of the container bodies are arranged in a row so that the planting spaces open in the same direction, and, among adjacent bodies, the water discharge opening of one connects in a communicating manner to a container body of another.

According to the present configuration, a plurality of container bodies are arranged in a row; therefore, by appropriately setting the number of container bodies to be arranged in a row, the planting container according to the present invention can be used for cultivating plants over a desired area, irrespective of the size of the area over which the planting containers are placed.

Additionally, the water discharge opening of one of two adjacent container bodies communicates with the other container body; therefore, planting water can be effectively stored in each container body, irrespective of the number of container bodies to be arranged in a row.

BEST MODE FOR CARRYING OUT THE INVENTION

Embodiments of a planting container according to the present invention will be described below with reference to the accompanying drawings.

Figure 1:
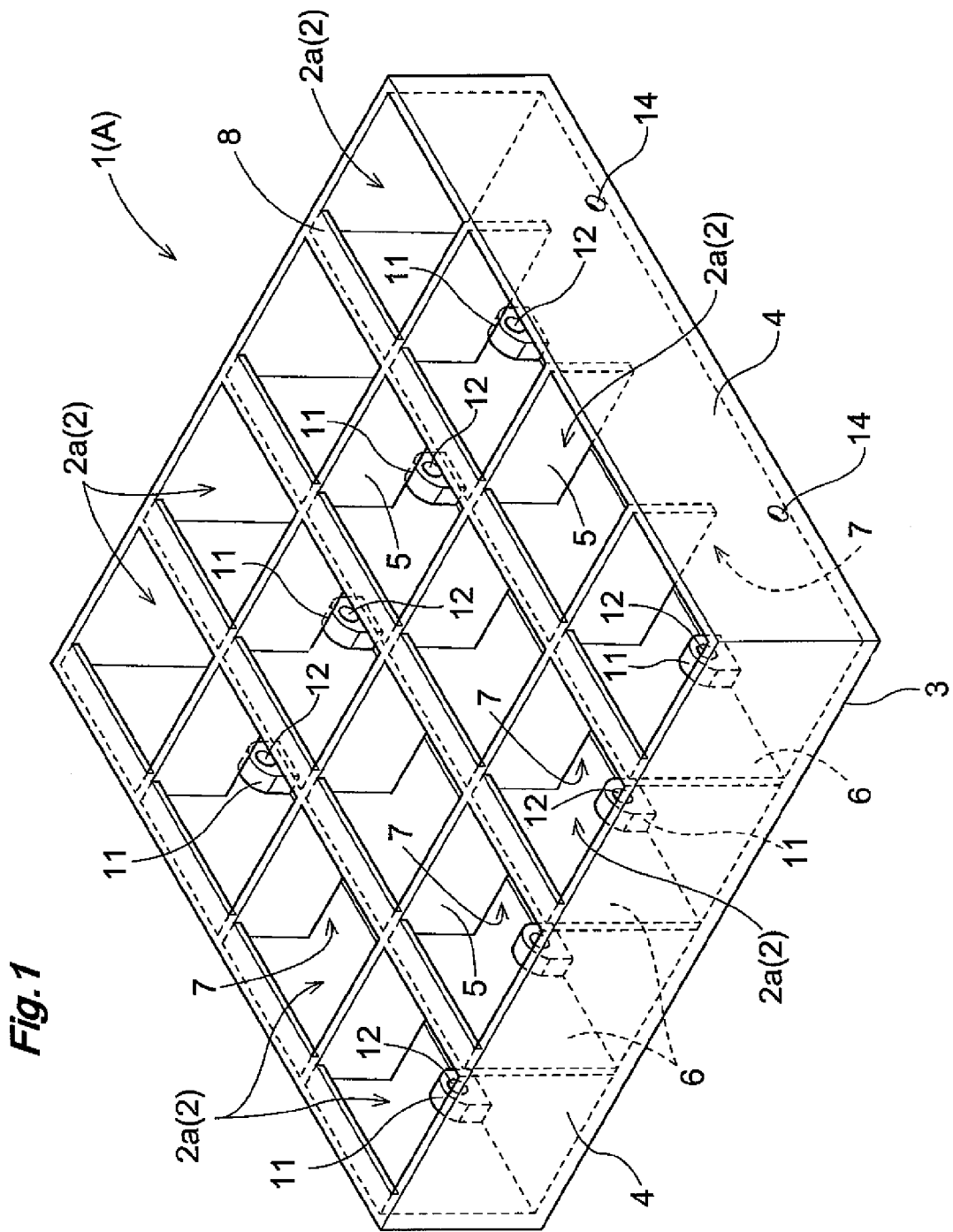
FIG. 1 is a perspective view of a planting container in a horizontal position.
Figure 2:
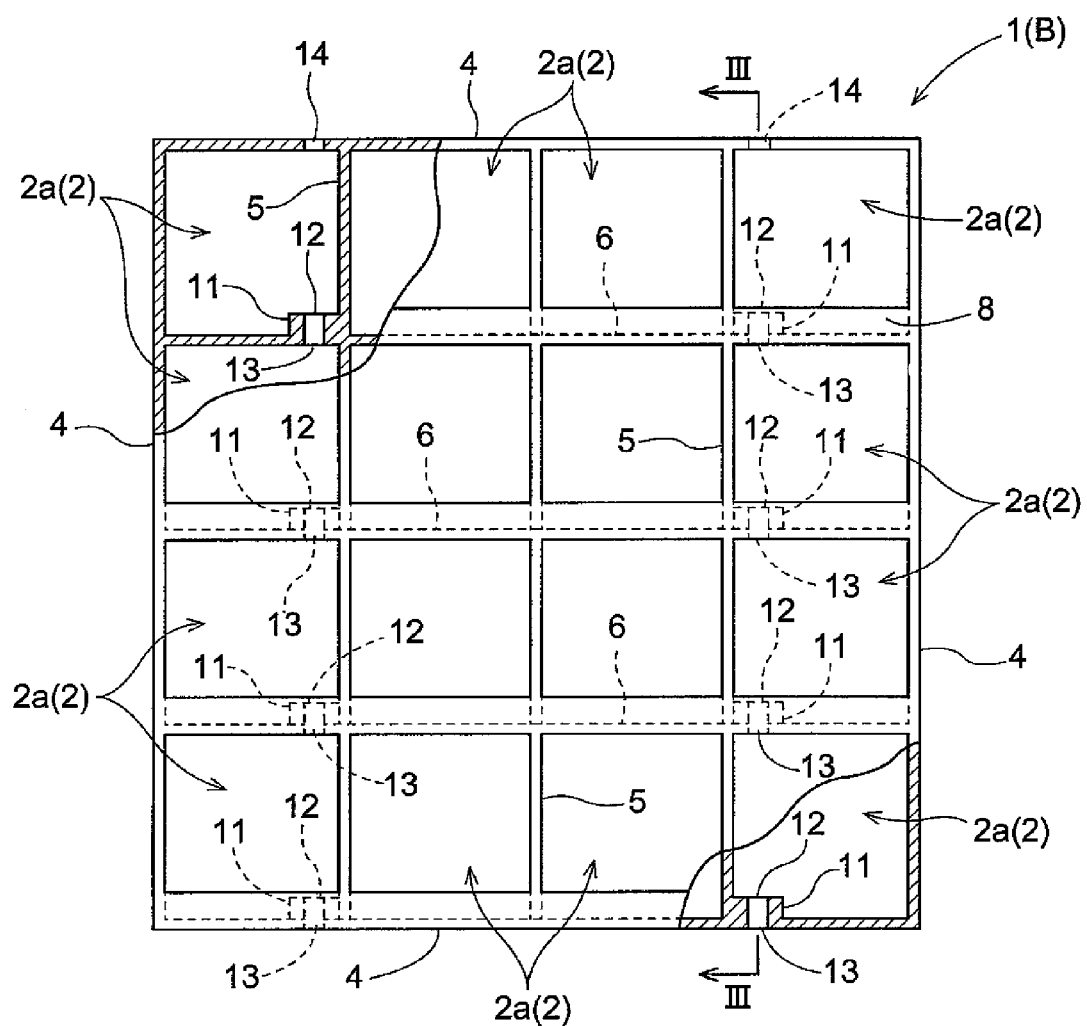
FIG. 2 is a partial cutaway frontal view of a planting container in a vertical position.
Figure 3:
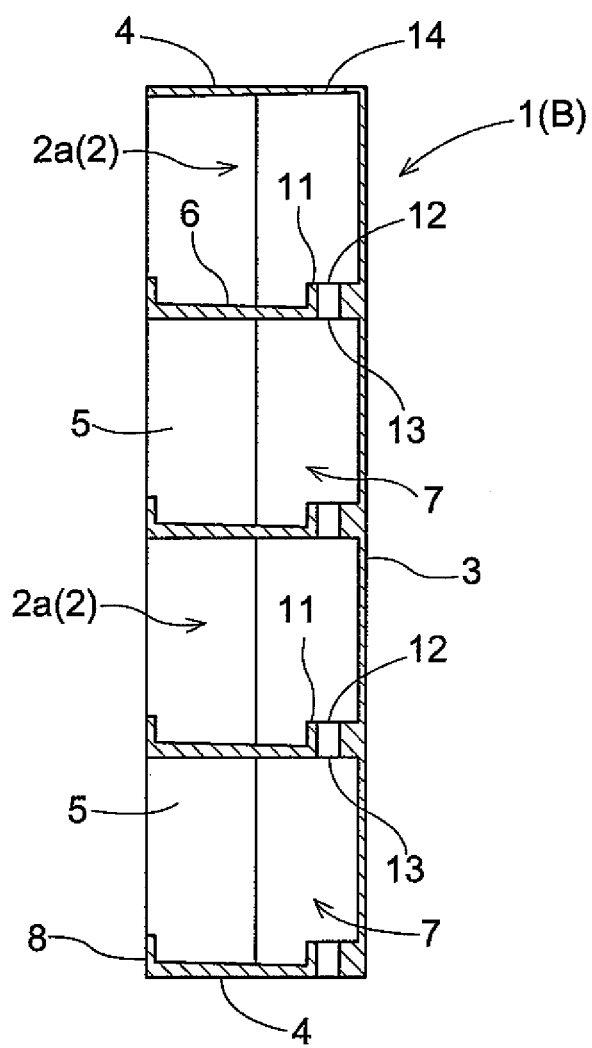
FIG. 3 is a cross-sectional view across line in FIG. 2.

FIG. 1 shows a planting container in a horizontal position A, and FIG. 2 and FIG. 3 shows a planting container in a vertical position B.

The planting container comprises a rectangular container body 1 made of, for example, a synthetic resin. The container body 1 has a bottom wall 3, and four side walls 4 disposed on the four sides of the bottom wall 3, in order to form a planting space 2 for cultivating a plant P (shown in FIG. 4 through FIG. 6).

The planting space 2 of the container body 1 is compartmentalized into a plurality of spaces for planting units 2a by a partition wall 5 disposed in a vertical direction and a sectioning wall 6 disposed in a lateral direction. In the present embodiment, the planting space 2 is compartmentalized into a total of 16 spaces for planting units 2a by three partition walls 5 and three sectioning walls 6.

Figure 4:
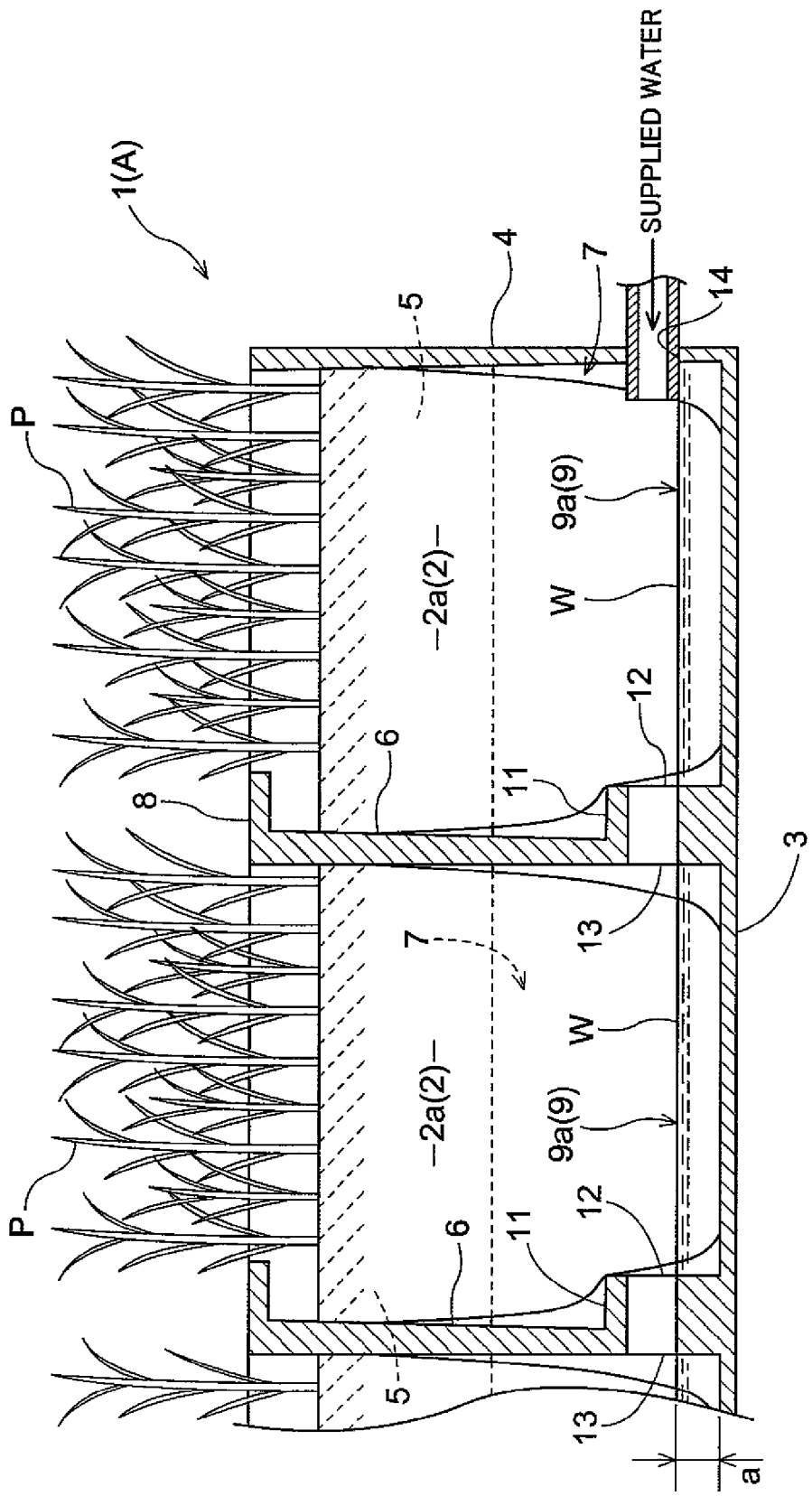
FIG. 4 is a cross-sectional view of a main part of a planting container in a horizontal position.

A communicating hole 7 through which planting water W shown in FIG. 4 and other drawings communicates is provided between spaces for planting units 2a that are adjacent on the left and right. Four dam sections 8 partially covering an upper surface of the spaces for planting units 2a are provided continuously between side walls 4 that face each other.

The bottom wall 3 and the side walls 4 form a horizontal water-holding section 9 for holding planting water W when the container body 1 is in a horizontal position A (FIG. 1) in which the planting space 2 opens upwards. In such an instance, the bottom wall 3 forms a bottom surface of the horizontal water-holding section 9.

In the present embodiment, the partition walls 5 and the sectioning walls 6 form each of 16 horizontal water-holding section units 9a. Four horizontal water-holding section units 9a arranged in a lateral direction not sectioned by the sectioning walls 6 communicate via the communicating hole 7.

Dam sections 8, formed facing either the bottom wall 3 and a side wall 4 or the sectioning wall 6 and the bottom wall 3, form a vertical water-holding section 10 for holding planting water W (FIG. 5) when the container body 1 is in a vertical position B in which the planting space 2 opens sideways (FIG. 2, FIG. 3). In such an instance, a side wall 4 or a sectioning wall 6 forms a bottom surface of the vertical water-holding section 10.

In the present embodiment, each of 16 vertical water-holding section units 10a is formed by the partition walls 5 and the sectioning walls 6.

More specifically, the four vertical water-holding section units 10a located on the bottom row, for example, are formed by the bottom wall 3, a side wall 4, the partition walls 5, and the dam sections 8. In such an instance, a side wall 4 forms a bottom surface of the vertical water-holding section 10.

In the case of vertical water-holding section units 10a that are not located on the bottom row, the six vertical water-holding section units 10a that are located on the left and right ends, for example, are formed by the bottom wall 3, the side walls 4, the partition walls 5, the sectioning walls 6, and the dam sections 8. In such an instance, a sectioning wall 6 forms a bottom surface of a vertical water-holding section 10.

Four vertical water-holding section units 10a arranged in a lateral direction not sectioned by the sectioning walls 6 are configured so that four vertical water-holding section units 10*a* communicate via a communicating hole 7.

A cylindrical body 11 for overflow, for keeping the amount of planting water W within the horizontal water-holding section 9 and the vertical water-holding section 10 of the container body 1 below a specific amount, is provided to the water-holding sections 9 and 10. An opening section at one end of the cylindrical body 11 is configured to be a water discharge outlet 12 for overflow, and an opening section at the other end is configured to be a water discharge outlet 13.

In the present embodiment, the cylindrical body 11 is provided to each of a total of eight spaces for planting units 2*a* that are four spaces for planting units 2*a* that are located at the leftmost side and four spaces for planting units 2*a* that are located at the rightmost side, as shown in FIG. 2.

Figure 5:
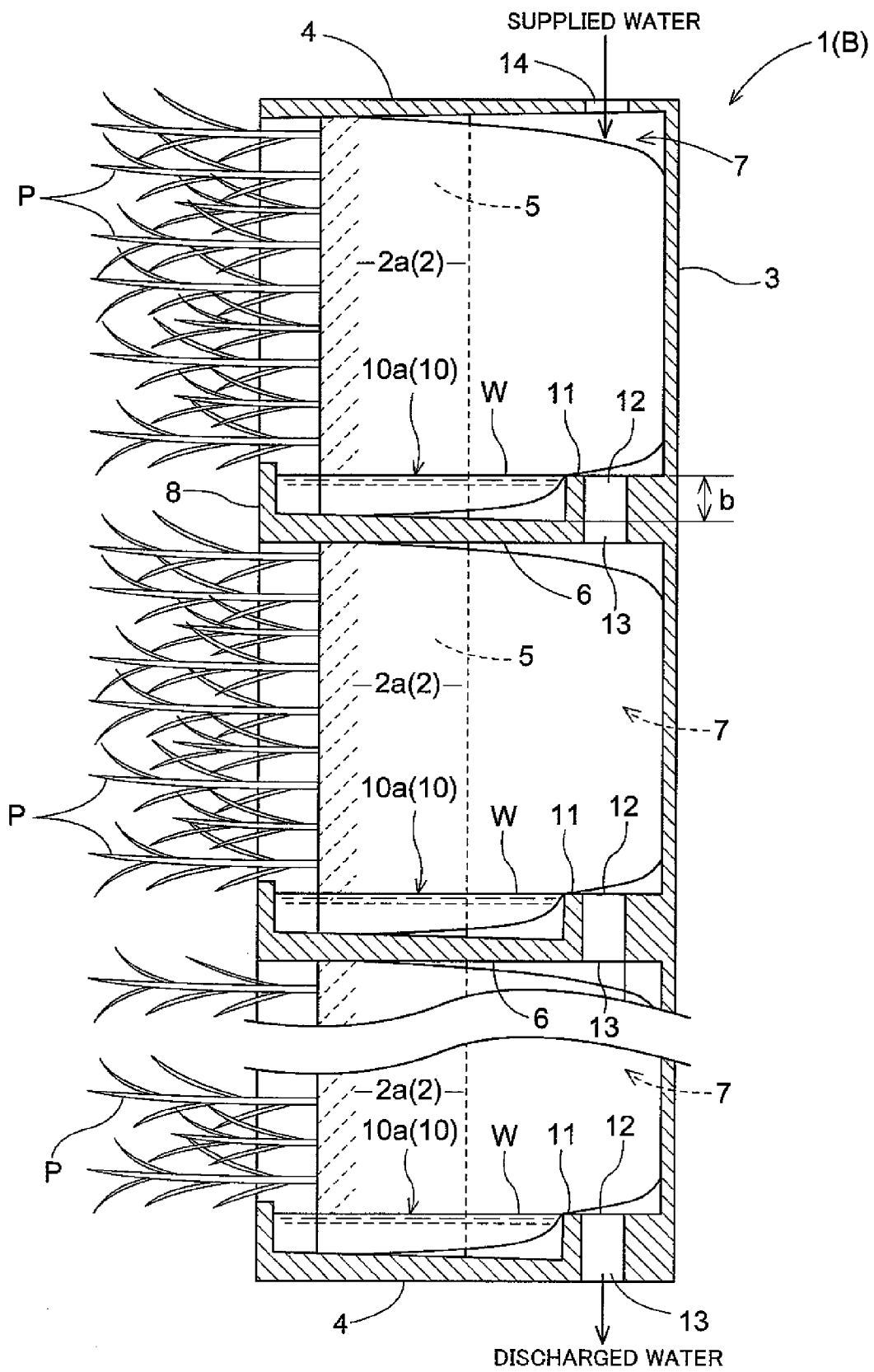
FIG. 5 is a cross-sectional view of a main part of a planting container in a vertical position.

A water discharge start section of a water discharge opening 12 of each cylindrical body 11 is provided at a position a predetermined distance a from the bottom wall 3 towards the dam section 8 in an instance of a horizontal position A shown in FIG. 4, and a predetermined distance b within the space for planting unit 2*a* from the side wall 4 or the sectioning wall 6 in an instance of a vertical position B shown in FIG. 5.

Adjacent spaces for planting units 2*a* communicate with one another via a water discharge opening 12 and a water discharge outlet 13 of the cylindrical body 11. In FIG. 2, two lowermost cylindrical bodies 11 are in a state in which the discharge outlets 13 of the cylindrical bodies 11 open on a side wall 4. Two water supply openings 14 are provided on a side wall 4 that faces the side wall 4 on which the discharge outlets 13 are formed.

The predetermined distance a and the predetermined distance b may be identical, or may differ.

A usage method of the planting container will now be described.

For example, when the planting container is used for placement on a relatively horizontal surface such as a balcony, the container body 1 is placed in a horizontal position A shown in FIG. 1 and FIG. 4. A commercially supplied plant bedding, planting soil, or the like are accommodated, and a plant P planted, in each of the spaces for planting units 2*a*. The planting water W may be supplied from the planting space 2 that opens upwards, or may be supplied by connecting a hose or the like to the water supply openings 14 (FIG. 4).

In an instance, for example, in which water is supplied from the water supply openings 14, four spaces for planting units 2*a* that are arranged in a lateral direction not sectioned by the sectioning holes 6 communicate via a communicating hole 7; therefore, first, planting water W is supplied to four spaces for planting units 2*a* that are located at the rightmost end in FIG. 4. When the planting water W subsequently reaches a level that is substantially the same as that of the predetermined distance a from the bottom wall 3, the planting water W flows from the water discharge opening 12 of the cylindrical body 11 to the water discharge outlet 13, and then flows out into spaces for planting units 2*a* that are adjacent to the left in FIG. 4. Water is ultimately supplied to every space for planting units 2*a*.

The start section of the water discharge opening 12 is located at a position set a predetermined distance a towards the dam section 8 from the bottom wall 3; therefore, the planting water W is kept within the spaces for each of the planting units 2*a* at a level that is approximately equal to or less than the predetermined distance a from the bottom wall 3. Therefore, a section equal to or less than the predetermined distance a forms the horizontal water-holding section unit 9*a*.

When the planting container is used for placement along a relatively vertical surface such as a revetment, the container body 1 is placed in a vertical position B shown in FIG. 2, FIG. 3, and FIG. 5. A commercially supplied planting material, planting soil, or the like are accommodated, and a plant P planted, in each of the spaces for planting units 2*a*. The planting water W may be supplied from the planting space 2 which opens sideways, or may be supplied by connecting a hose or the like to the water supply openings 14 (FIG. 5).

In an instance, for example, in which water is supplied from the water supply openings 14, first, planting water W is supplied to four spaces for planting units 2*a* that are located at the top end in FIG. 5, and is contained in the vertical water-holding section units 10*a* of the four spaces for planting units 2*a*. When the planting water W subsequently reaches a level approximately that of the predetermined distance b from the sectioning wall 6, the planting water W flows from the water discharge opening 12 of the cylindrical body 11 to the water discharge outlet 13, and then flows out into spaces for planting units 2*a* that are downwardly adjacent in FIG. 5. Water is ultimately supplied to every space for planting units 2*a*.

The start section of the water discharge opening 12 protrudes upwards by a distance b from the sectioning wall 6 and the side wall 4; therefore, the planting water W is kept within the spaces for each of the planting units 2*a* at a level that is approximately equal to or less than the predetermined distance b from the sectioning wall 6 and the side wall 4. Therefore, a section equal to or less than the predetermined distance b forms the vertical water-holding section unit 10*a*.

Thus, the planting container of the present invention can be used in a state in which the container body 1 is in a horizontal position A, or a state in which the container body 1 is in a vertical position B. In either position, the water discharge opening 12 of the cylindrical body 11 also functions as a water discharge opening for overflow.

The planting container may be used for planting in which only one of the container body 1 is used. However, a plurality of container bodies 1 can be arranged in a row, depending on the size of the area of a balcony, a revetment or the like on which the container bodies 1 are placed. An example of such an arrangement is shown in FIG. 6.

Figure 6:
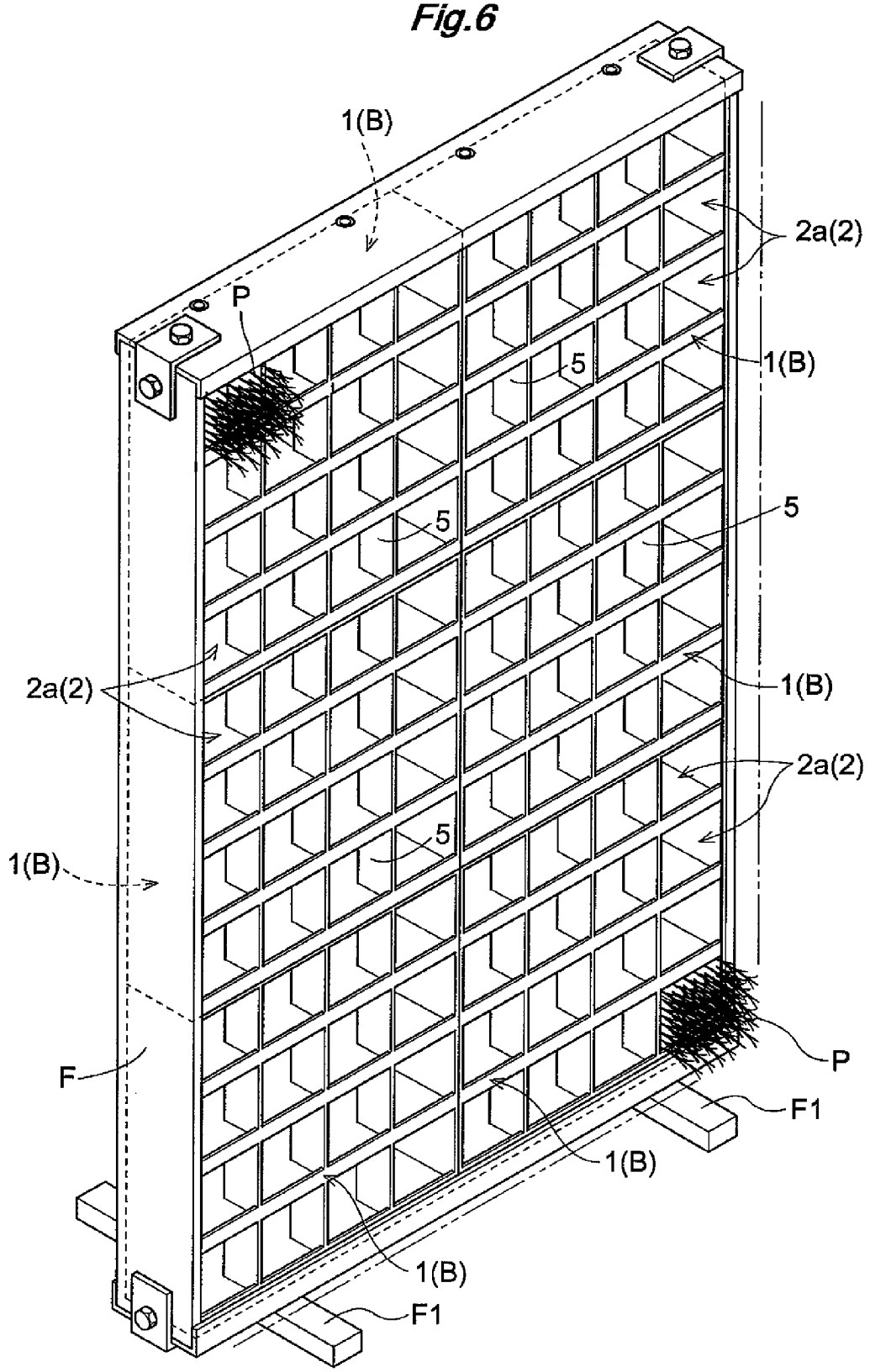
FIG. 6 is a perspective view of a planting container in a vertical position.

In the example shown in FIG. 6, six container bodies 1 are placed in a row so that the planting spaces 2 open in the same direction, whereby for each of the adjacent container bodies 1, a water discharge opening 12 of an upwardly located container body 1 communicates with a planting space 2 of a downwardly located container body 1 via the water discharge outlet 13 and a water supply opening 14; and the six container bodies are maintained in a frame F having a stand F1.

Another Embodiment

Another embodiment of the planting container according to the present invention will now be described. In order to avoid a repetition of the description, component parts described in the previous embodiment and component parts having an identical function will be indicated with identical keys so that the descriptions can be omitted. In the main, descriptions will be only be provided for those components that are not the same.

(1) In the previous embodiment, an example was given in which the planting space 2 is compartmentalized into 16 spaces for planting units 2*a* by three partition walls 5 and sectioning walls 6. However, the number of the compartmentalized spaces for planting units 2*a* is not restricted to 16, making it possible to realize an embodiment in which the planting space 2 is compartmentalized into two or more spaces for planting units 2*a*.

Figure 7:
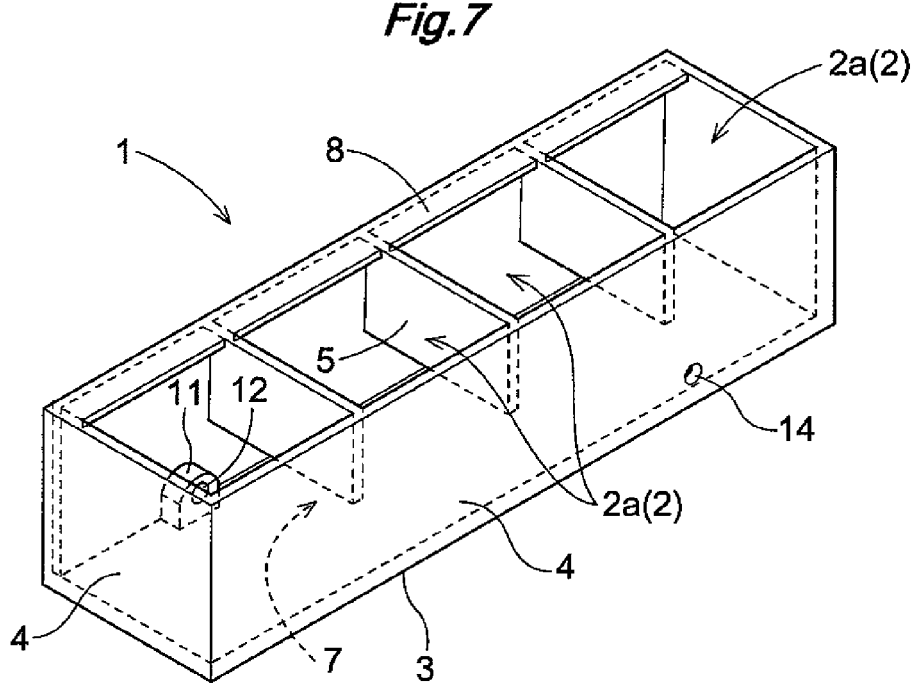
FIG. 7 is a perspective view of a planting container in a horizontal position according to another embodiment.

In an instance in which the planting space 2 is compartmentalized into a plurality of spaces for planting units 2a, the planting space 2 can be compartmentalized into a plurality of spaces for planting units 2a by using only the partition wall 5, without using the sectioning wall 6, as shown in FIG. 7. In this instance, a plurality of spaces for planting units 2a are arranged in a row in a lateral direction, and adjacent spaces for planting units 2a communicate via the communicating hole 7 provided on the partition wall 5, when the container body 1 is in a vertical position B.

In other words, the previous embodiment shows an example in which the planting space 2 is compartmentalized by partition walls 5 and sectioning walls 6 into a plurality of spaces for planting units 2a arranged in a lateral and vertical direction when the container body 1 is in a vertical position B; however, in the embodiment shown in FIG. 7, a container body 1 comprises four spaces for planting units 2a that would have been arranged in a row in a lateral direction in the previous embodiment.

In the embodiment shown in FIG. 7, one cylindrical body 11 for overflow and one water supply opening 14 are provided.

Figure 8:
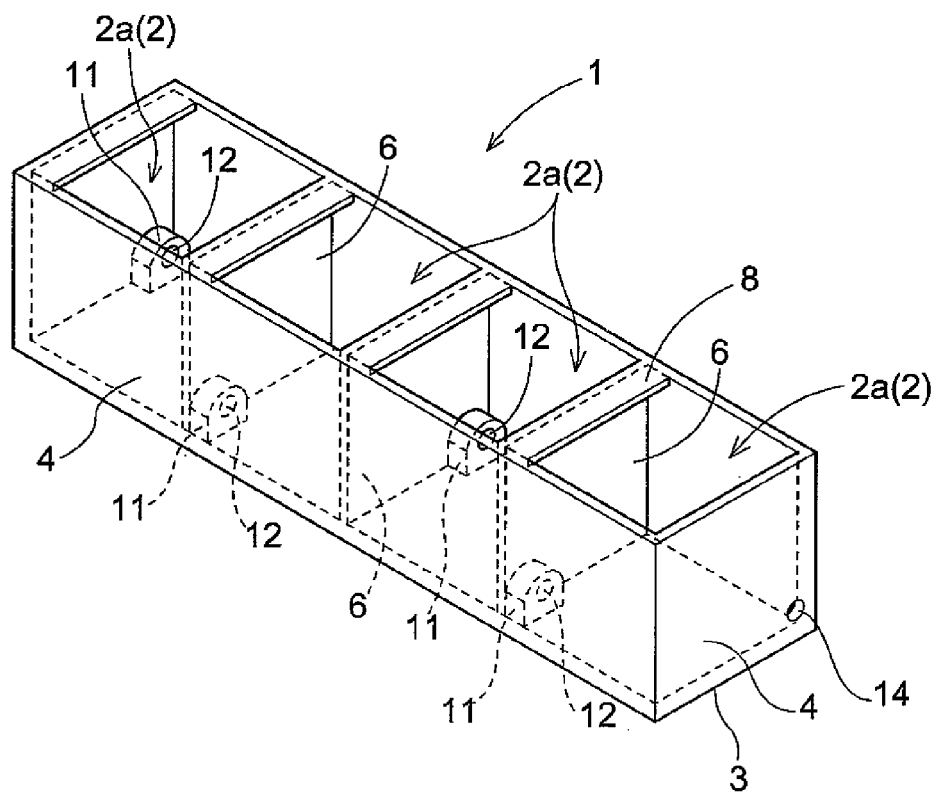
FIG. 8 is a perspective view of a planting container in a horizontal position according to another embodiment.

In an instance in which the planting space 2 is compartmentalized into a plurality of spaces for planting units 2a, the planting space 2 can be compartmentalized into a plurality of spaces for planting units 2a by using only the sectioning wall 6, without using the partition wall 5, as shown in FIG. 8. In other words, it is also possible to have an embodiment in which the container body 1 comprises four spaces for planting units 2a that would have been arranged in a vertical direction in the previous embodiment. Specifically, a plurality of spaces for planting units 2a are arranged in a vertical direction, and adjacent spaces for planting units 2a communicate via a water discharge opening 12 for overflow provided on the sectioning wall 6, when the container body 1 is in a vertical position B.

In the embodiment shown in FIG. 8, the water discharge opening 12 and the water supply opening 14 are located in mutually different positions. Specifically, the water discharge opening 12 and the water supply opening 14 are located alternately to the left and right, when the container body 1 is in a vertical position B.

When connected in a vertical direction, the container bodies 1 are configured so that the water discharge opening 12 of an upper container body 1 is located in the same position as the water supply opening 14 of the lower container body 1. Such a configuration can also be applied to the container body 1 shown in the previous embodiment.

(2) Although not shown, it is also possible to realize an embodiment in which the planting space 2 is not compartmentalized into spaces for planting units 2a, but is in a state having a single planting space 2.

In such an instance, a bottom wall 3 and a side wall 4 form the planting space 2 and a horizontal water storing section 9; and a bottom wall 3, a side wall 4, and a dam section 8 form a vertical water storing section 10.

(3) In the previous embodiments, configurations of the planting container were mainly described. However, in an actual application, other important issues include allowing the planting container to be manufactured as simply and inexpensively as possible. A specific manufacturing example for readily manufacturing the planting container will now be described with reference to FIGS. 9 through 11.

Figure 9:
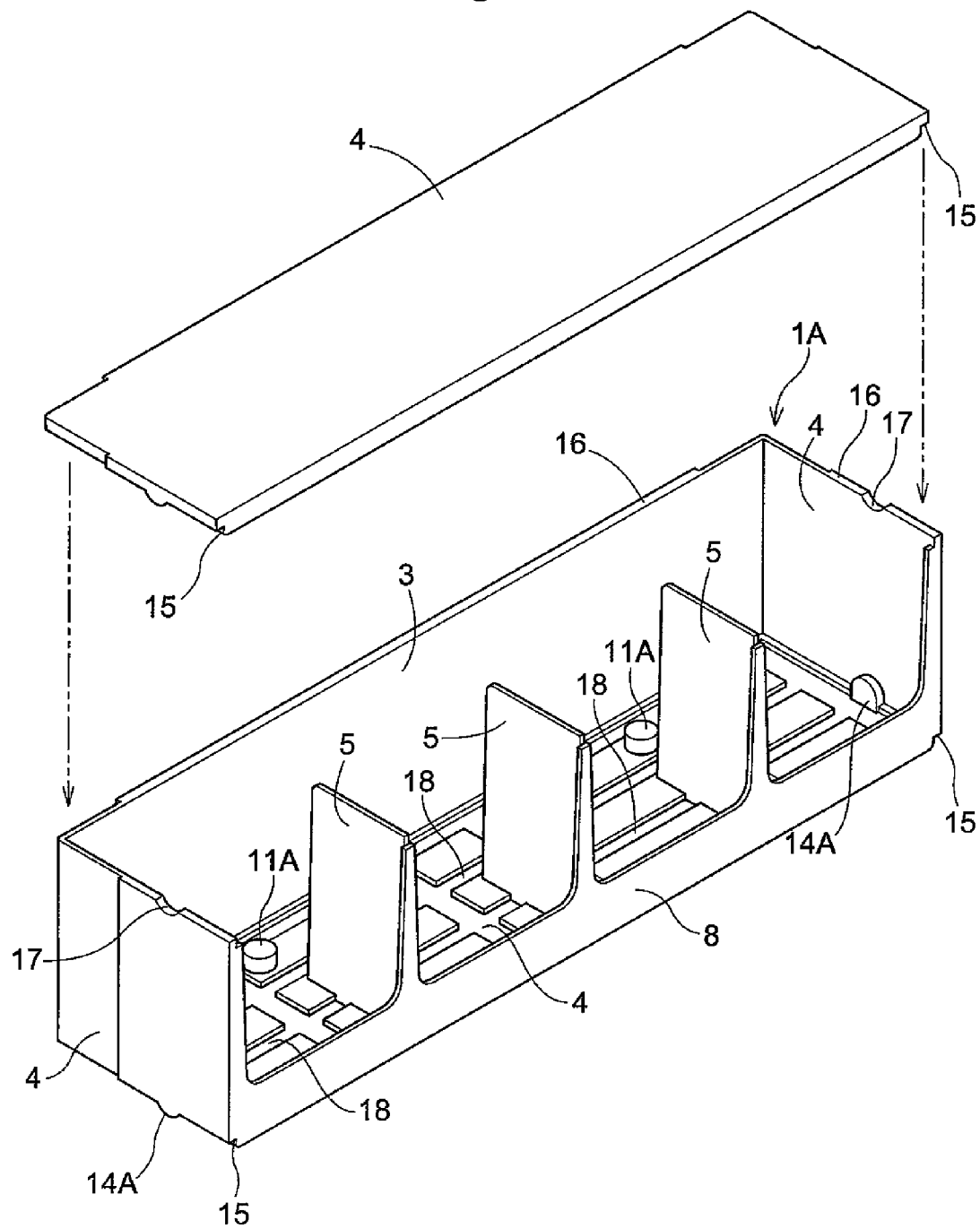
FIG. 9 is an exploded perspective view of a planting container according to another embodiment.

FIG. 9 shows a partially manufactured article 1A and a side wall 4 of the container body of the planting container.

The partially manufactured article 1A of the container body integrally comprises a bottom wall 3 shown in the previous embodiments, three side walls 4 disposed on three sides of the bottom wall 3, three partition walls 5, and a dam section 8; and comprises an integrally molded article made from a synthetic resin.

The partially manufactured article 1A shown in FIG. 9 is similar to a configuration in which a side wall 4 located on the near side in the container body 1 of the planting container shown in FIG. 7 has been removed from the container body 1. A pillar-shaped body 11A for forming a cylindrical body 11 for overflow and a water discharge opening 12, and a protrusion 14A for forming a water supply opening 14, are integrally formed on the partially manufactured article 1A.

A step section 15 for engaging with the partially manufactured article 1A is formed on three sides of a side wall 4 that is configured as a separate article with respect to the partially manufactured article 1A. An upper end edge 16 located at the top of the partially manufactured article 1A shown in FIG. 9 is configured to engage with the step section 15 of the side wall 4. Another step section 15, identical to the step section 15 on the separately configured side wall 4, is also formed on three sides of the side wall 4 that is located at the bottom of the partially manufactured article 1A.

Reference number 17 in the drawing identifies a concave section into which the protrusion 14A is inserted, and reference number 18 in the drawing identifies a concave groove to aid the flow of planting water W.

The partially manufactured article 1A of the container body is a integrally molded article made of a synthetic resin, and can therefore be manufactured simply and inexpensively. It shall be apparent that the side wall 4, being of simple shape, can be readily manufactured at low cost with a synthetic resin.

Using, e.g., one partially manufactured article 1A and one side wall 4, the step section 15 of the side wall 4 is caused to engage with the upper end edge 16, and an adhesive or the like may be used as required to bond the assembly together. A through-hole; i.e., a water discharge opening 12 for overflow (see FIG. 10), is formed on the pillar shaped body 11A, thereby making it possible to readily manufacture a container body 1 of a planting container such as one shown in FIG. 7.

Figure 10:
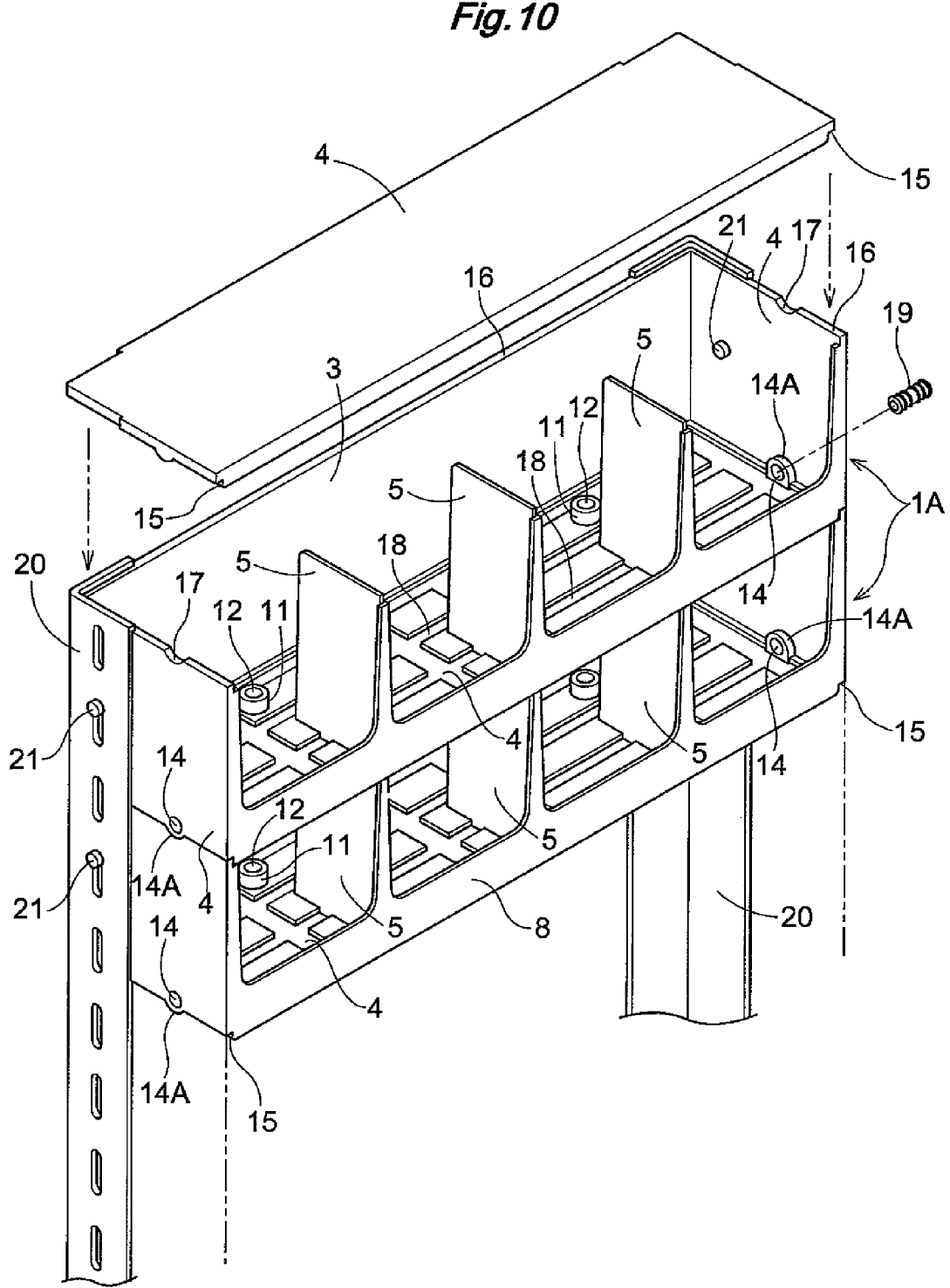
FIG. 10 is a perspective view showing an assembly procedure of a planting container according to another embodiment.
Figure 11:
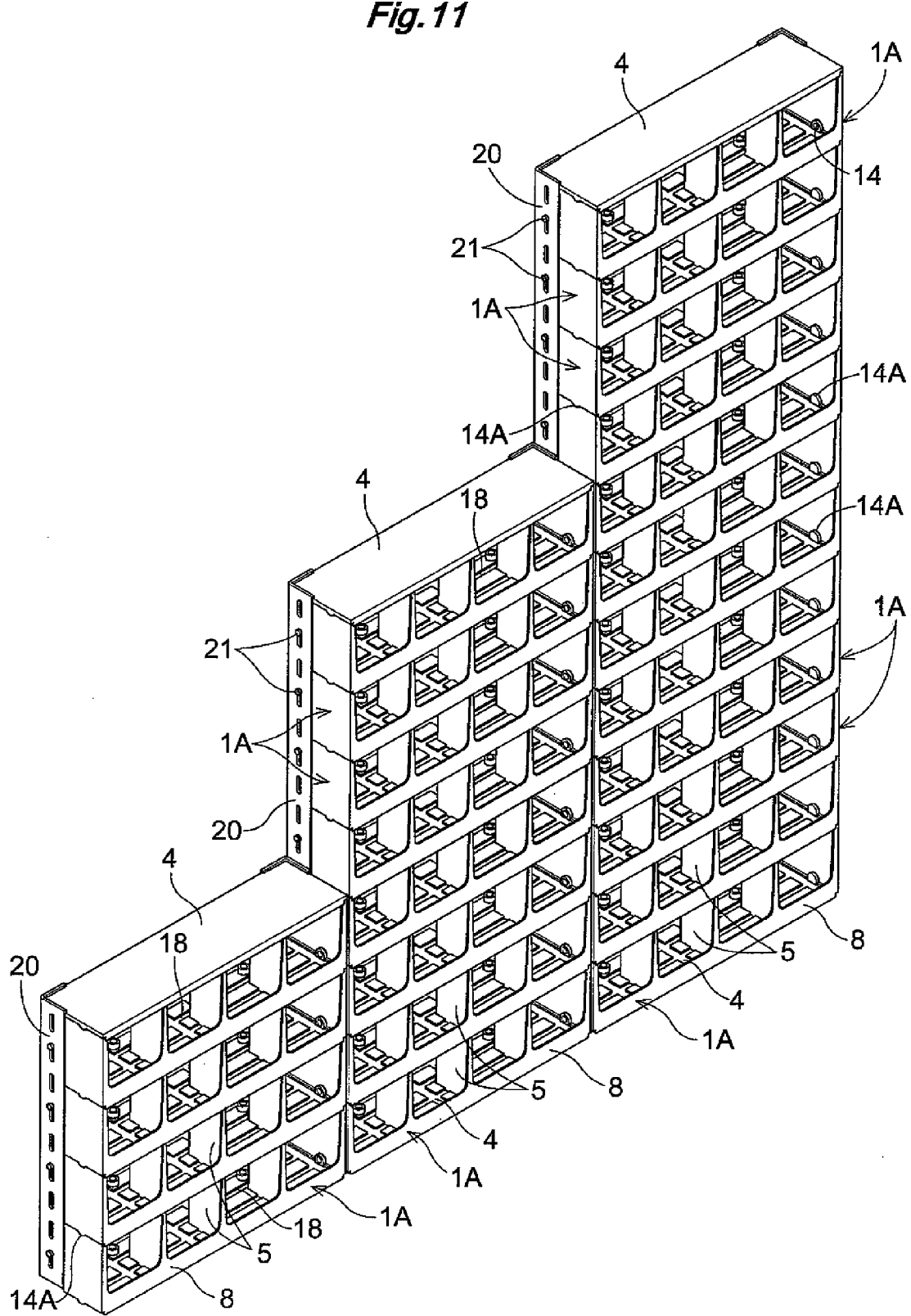
FIG. 11 is a perspective view showing a state during assembly of a planting container according to another embodiment.

As shown in FIG. 10 and FIG. 11, a step section 15 of a partially manufactured article 1A is caused to engage with the upper edge section 16 of another partially manufactured article 1A, so that a plurality of partially manufactured articles 1A will be successively placed on top of one another; and the step section 15 of the side wall 4 is caused to engage the upper end edge 16 of the uppermost partially manufactured article 1A, thereby allowing a planting container of any desired height to be formed. In such an instance, the protrusion 14A of an upper partially manufactured article 1A is inserted into the concave section 17 of a lower partially manufactured article 1A, As described above, a through-hole can be formed on the pillar-shaped body 11A, thereby forming a water discharge opening 12 for overflow.

A through-hole is formed on a protrusion 14A of the uppermost partially manufactured article 1A, the hole being formed as a water supply opening 14, for example, on the bottom wall 3 or the side wall 4 located at the top in FIG. 10. A hose-connecting implement 19 for connecting a water hose may be affixed to the water supply opening 14. A through-hole may also be formed, as required, on a protrusion 14a located to the left, and a protrusion 14a of a lower partially manufactured article 1A; and used as an opening 14 for supplying and discharging water to and from a laterally adjacent planting container not shown in the drawing.

A water supply hole 14 may also be formed by forming a through-hole on a protrusion 14A that is located on the right in FIG. 10 of the protrusions 14A of the uppermost partially manufactured article 1A.

As required, an angled article 20 can be disposed on a corner section of the stacked layers of partially manufactured articles 1A, and connecting each of the partially manufactured articles 1A to each of the angled articles 20 using an appropriate connecting implement 21, thereby strengthening the planting container itself and allowing the planting containers to be arranged in a row in a lateral direction along a revetment and the like.

Figure 12:
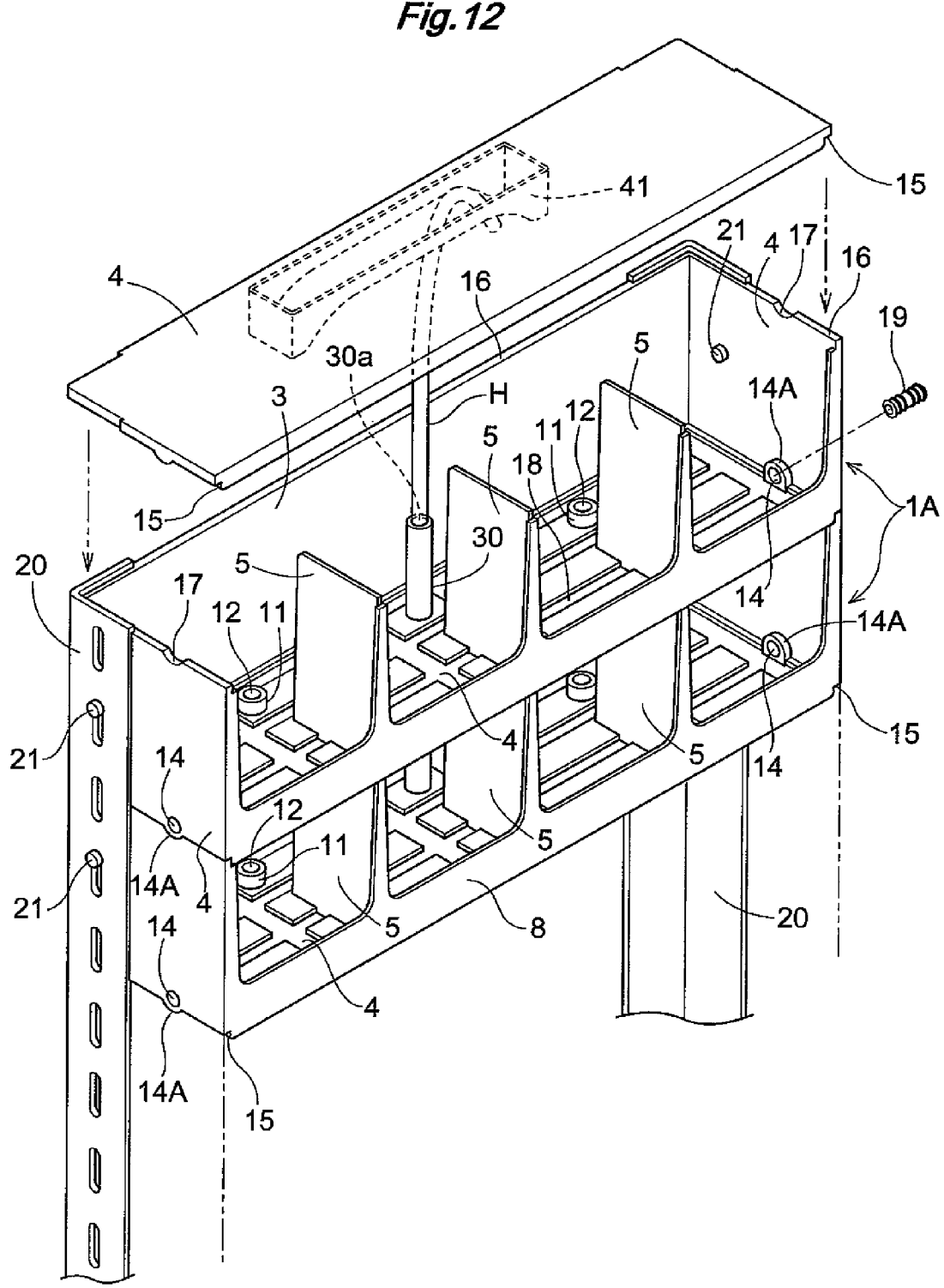
FIG. 12 is a perspective view showing a state during assembly of a planting container according to another embodiment.

(4) A guide member 41, for guiding, e.g., a hose H for carrying up planting water, can be provided on the surface of the side wall 4 facing the partially manufactured article 1A (the container body 1) in the above embodiment (FIG. 12). The guide member 41 can be configured in the shape of a groove, rail, or the like so that the direction of an opening section at an upper end of the hose H turns after the opening section at the upper end of the hose H comes into contact with the guide member 41.

A cylindrical body 30, having a through-hole 30a through which the hose H passes, is provided to each of the partially manufactured articles 1A. The cylindrical bodies 30 are provided so that for each vertically adjacent partially manufactured article 1A, each cylindrical body 30 is located in the same position.

The hose H is passed through the through-hole 30a of the cylindrical body 30 for each of the partially manufactured articles 1A. The opening section at the upper end of the hose H comes into contact with the guide member 41, whereby the direction of the hose H is turned. The turn in direction allows the hose H to be configured so that, e.g., the opening section at the upper end of the hose H faces downwards. Thus, soil for planting that exists in the planting space can be prevented from entering and thereby blocking the through-hole 30a.

In this configuration, planting water W contained, for example, in a tank (not shown) located below the lowermost container body 1 can be pumped by a pump (not shown) with the hose H to a water-holding section of the uppermost container body 1 and circulated.

Planting water W contained in the water-holding section of the uppermost container body 1 flows into a water-holding section of the container body 1 adjacent to the underside thereof via a water discharge opening 12.

INDUSTRIAL APPLICABILITY

The present invention can be used for a planting container, wherein the planting container body comprises a bottom wall and a side wall forming a planting space, and a water-holding section for holding planting water supplied to the planting space. A water discharge opening for overflow is provided to the water-holding section.

The invention claimed is:

1. A planting container, comprising:
    a planting container body having
    a bottom wall and a side wall forming a planting space, the planting space being adapted to plant a plant and to store water;
    a horizontal water-holding section formed from, at least, the bottom wall and the side wall of the container body, the horizontal water-holding section for holding planting water when the container body is in a horizontal position in which the planting space opens upwards; and
    a vertical water-holding section formed from, at least, the bottom wall of the container body, the side wall of the container body, and a dam section formed facing the bottom wall on the side wall, the vertical water-holding section for holding the planting water, when the container body is in a vertical position in which the planting space opens sideways;
    the horizontal water-holding section and the vertical water-holding section being provided with a water discharge opening for allowing excess planting water to overflow out of the planting space;
    the water discharge opening works as a means for allowing excess planting water to overflow out of the planting space in the horizontal position and a means for allowing excess planting water to overflow out of the planting space in the vertical position; and
    a water discharge start section of the water discharge opening being located at a position a predetermined distance away from the bottom wall and a predetermined distance away from the side wall.

2. The planting container according to claim 1, wherein the planting space of the container body is compartmentalized by a partition wall into a plurality of spaces for planting units arranged in a row, the row being in a lateral direction when the container body is in the vertical position; and mutually adjacent spaces for planting units are linked by a communication hole for the planting water, the communication hole being provided on the partition wall.

3. The planting container according to claim 1, wherein the planting space of the container body is compartmentalized by a sectioning wall into a plurality of spaces for planting units arranged in a row, the row being in a vertical direction when the container body is in the vertical position; and mutually adjacent spaces for planting units are linked by the water discharge opening provided on the sectioning wall.

4. The planting container according to claim 1, wherein the planting space of the container body is compartmentalized by a partition wall and a sectioning wall into spaces for planting units arranged in a plurality of rows in each of a lateral direction and a vertical direction when the container body is in the vertical position; spaces for planting units that are mutually adjacent in the lateral direction being linked by a communication hole for the planting water provided on the partition wall; and spaces for planting units that are mutually adjacent in the vertical direction being linked by the water discharge opening provided on the sectioning wall.

5. The planting container according to claim 3 or claim 4, wherein the water discharge openings that are vertically adjacent when the container body is in the vertical position are located in mutually different positions.

6. The planting container according to any of claims 1 through claim 4, wherein a plurality of the container bodies are arranged in a row so that the planting spaces open in the same direction; and, among adjacent container bodies, the water discharge opening of one connects in a communicating manner to a container body of another.

* * * * *